Figure 1:
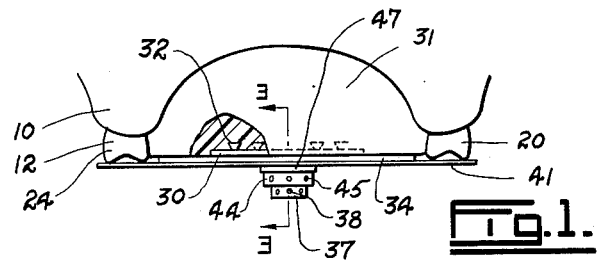

Jan. 11, 1955 M. M. CHECKIK 2,698,998

PARALLEL POSITIONER FOR DENTAL BURS

Filed April 7, 1952 2 Sheets-Sheet 1

INVENTOR
MAURICE MANLEY CHECHIK
BY
Fetherstonhaugh & Co.
ATTORNEYS

Jan. 11, 1955   M. M. CHECKIK   2,698,998
PARALLEL POSITIONER FOR DENTAL BURS
Filed April 7, 1952   2 Sheets-Sheet 2
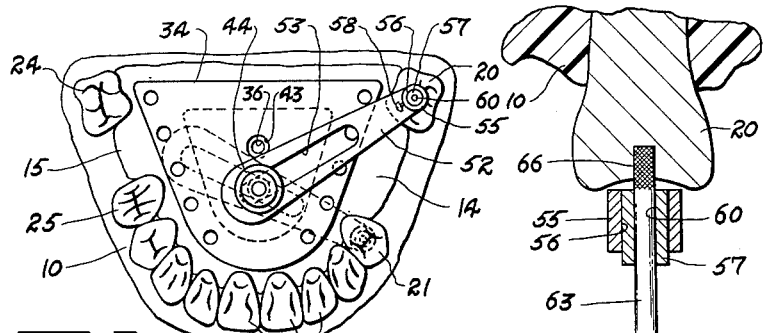
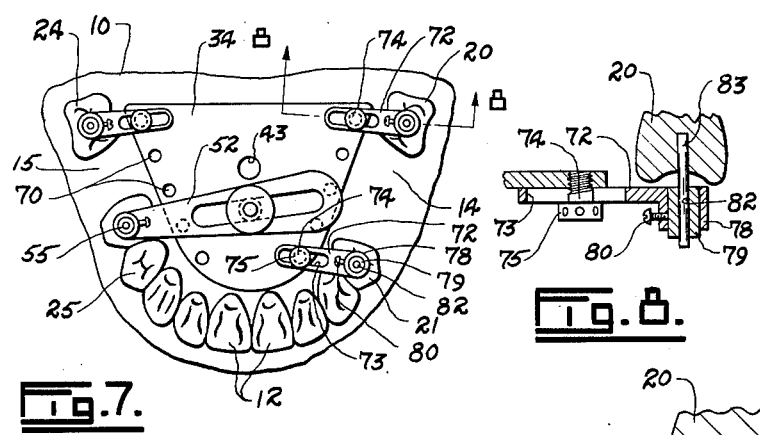
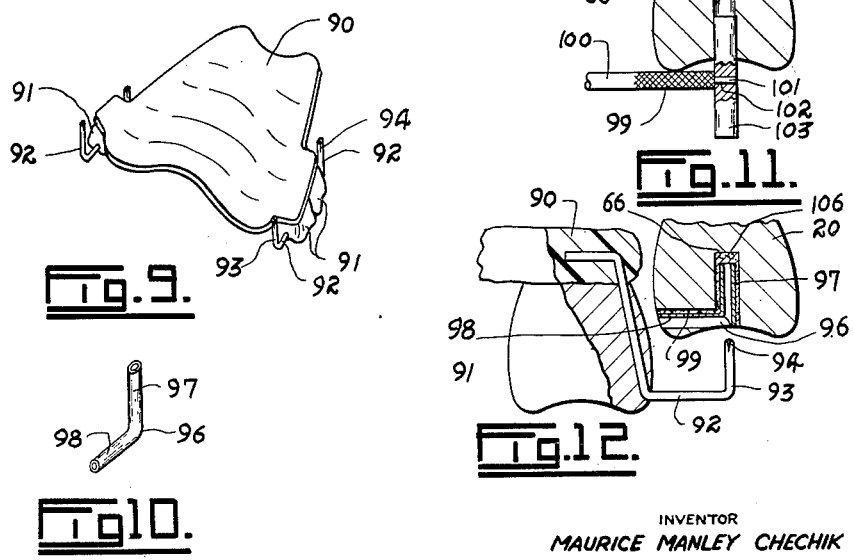
INVENTOR
MAURICE MANLEY CHECHIK
BY
Fetherstonhaugh & Co.
ATTORNEYS

United States Patent Office 2,698,998
Patented Jan. 11, 1955

2,698,998

PARALLEL POSITIONER FOR DENTAL BURS

Maurice Manley Checkik, Vancouver, British Columbia, Canada

Application April 7, 1952, Serial No. 280,877

18 Claims. (Cl. 32—67)

This invention relates to apparatus for enabling a dentist to drill a plurality of parallel holes in a number of teeth within a patient's mouth.

The main purpose of this invention is to prepare any number of abutment teeth to support a prosthetic appliance carrying one or more artificial teeth, said appliance being either fixed or removable. In order to insert the appliance, the preparations of the abutment teeth must be parallel. According to this invention, parallel cavities are prepared in the abutment teeth. Prior to this invention, it was practically impossible to drill parallel holes in teeth located anywhere in the dental arch.

The apparatus according to this invention makes it possible in a comparatively simple manner to drill parallel holes in any desired number of teeth in an upper or lower jaw. Furthermore, when an abutment tooth needs to be repaired, this apparatus may be utilized to drill a hole in the repaired tooth parallel to those remaining in the other abutment teeth.

The apparatus comprises means for forming a substantially level foundation within the upper or lower dental arch of the patient, and a bur positioning arm pivotally and slidably mounted on this foundation. The arm is so mounted that its outer end may be moved into position overlapping the outer end of any desired tooth, said arm having an elongated vertical passage in its outer end through which a dental bur may extend to the tooth. After a vertical hole is drilled in the tooth, the outer end of the arm is moved over another tooth in which a vertical hole is drilled. Since the bur extends through the passage of the arm in each case, the holes must be parallel to each other. This procedure may be repeated for any desired number of teeth.

When an abutment tooth has been repaired or rebuilt, it is possible to drill a hole in the restored tooth which is parallel to the hole in any other abutment tooth. The apparatus includes means for so locating the bur positioning arm relative to the sound abutment teeth that a hole may be drilled in the restored tooth which is parallel to the hole of each sound abutment tooth.

This invention may be utilized for preparing two or more abutment teeth for a prosthetic appliance carrying one or more artificial teeth. By way of example, the invention will be described and illustrated in connection with the preparation of four abutment teeth for a bilateral appliance.

Figure 2:
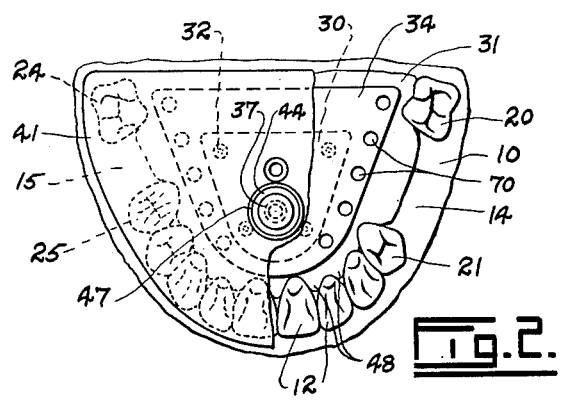
Figure 3:
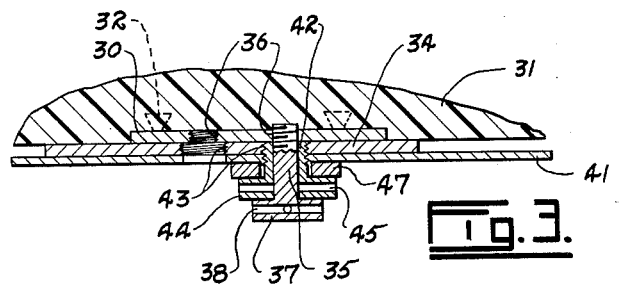
Figure 4:
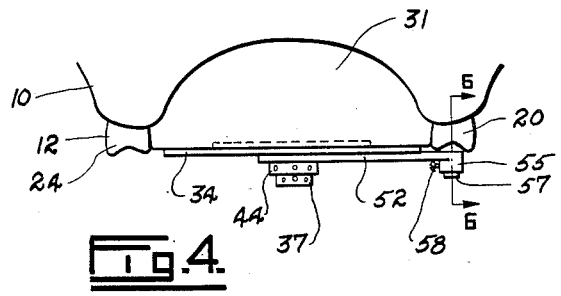

Examples of this invention are illustrated in the accompanying drawings, in which:

Figure 1 is a diagrammatic view looking outwardly from the back of a mouth with the apparatus positioned in the upper dental arch for producing the substantially level foundation, Figure 2 is a plan view of the apparatus illustrated in Figure 1 with part thereof broken away, Figure 3 is an enlarged fragmentary vertical section taken on the line 3—3 of Figure 1, Figure 4 is a view similar to Figure 1 with the apparatus ready for the drilling operation, Figure 5 is a plan view of the apparatus of Figure 4, Figure 6 is an enlarged vertical section taken on the line 6—6 of Figure 4 showing a dental bur forming a hole or cavity in a tooth, Figure 7 is a view similar to Figure 5 of the apparatus ready for drilling a hole or cavity in an abutment tooth which has been repaired, and, Figure 8 is an enlarged section view taken substantially on the line 8—8 of Figure 7.

Referring to Figures 1 to 3 of the drawings, 10 diagrammatically illustrates an upper dental arch having teeth 12 therein. Previously extracted teeth have left gaps 14 and 15 on opposite sides of the arch. Abutment teeth 20 and 21 are located on opposite sides of the gap 14, while abutment teeth 24 and 25 are located on opposite sides of the gap 15. The purpose of this apparatus is to drill parallel holes or cavities in the abutment teeth 20, 21, 24 and 25.

The parallel positioner includes an anchor plate 30 which is to be embedded in a mass 31 of modelling compound or other suitable plastic material. In the illustrated example, the plate is embedded in the compound and has a plurality of anchors 32 projecting outwardly therefrom firmly to connect it to the compound. A carrier 34 overlies and is removably connected to the anchor plate by means of a bolt 35 which extends through the carrier and is threaded into one of a plurality of internally-threaded holes 36 in the plate. The bolt is provided with a head 37 which may have a plurality of flat sides for receiving a spanner or, as shown, it may be circular and have a plurality of holes 38 therein for receiving a tool for turning the bolt. A levelling plate 41 overlies the carrier and is removably secured to the anchor plate in any convenient manner. In this example, a hollow bolt 42 is threaded into any one of a plurality of internally-threaded holes 43 in the carrier. The bolt 42 has a head 44 on its outer end which is similar to the head 37 and, in this example, has a plurality of holes 45 therein. In Figures 1 to 3, a fairly thick washer 47 lies between the bolt head 43 and the levelling plate 41. In order to save space, the bolt 35 extends through the hollow bolt 42 and its head bears against the head 44.

Figures 1 to 3 illustrate the apparatus used in the first stage of the operation. The modelling compound mass 31 which has previously been shaped roughly to fit into the dental arch of the patient being treated, is softened and pressed into place within the arch. The anchor plate 30, carrier 34 and levelling plate 41 are all in position at this time, said anchor plate being fixedly connected to the mass. When the mass is pressed into the mouth it is soft enough to flow partly into the spaces between the teeth, as illustrated at 48 in Figure 2, to help retain the various elements of this apparatus in position. The levelling plate is pressed towards the teeth until it contacts the biting surfaces thereof, as clearly shown in Figure 1. This ensures the anchor plate and carrier being approximately level relative to the teeth. The material of the mass 31 may be such that it will adhere to the teeth and arch of the mouth, or a suitable adhesive may be applied to it to be sure that it will remain in the position attained when the levelling plate bears against the teeth.

The bolt 35 may now be turned by means of its head 37 to free the carrier and the levelling plate from the anchor plate so that the latter may be removed from the mouth. The action described so far has resulted in the anchor plate being positioned in the patient's mouth comparatively level with respect to the teeth 12.

After removing the carrier and levelling plate from the mouth, they are separated by removing bolt 42. The levelling plate and washer 47 are now discarded.

A bur positioning arm 52 is attached to the carrier by means of the bolt 42. This arm, see Figures 4 and 5, has an elongated slot 53 adjacent and extending inwardly from one end thereof. The bolt 42 extends through this slot and is threaded into the carrier to connect the arm to the latter. A head 55 is provided at the outer end of the arm and has a vertical passage 56 therein in which a bushing 57 is removably retained by means of a set screw 58. This bushing is provided with a vertical passage 60 extending therethrough centrally thereof. A plurality of these bushings are provided having vertical passages of different diameters to receive dental burs of different sizes. Figure 6 illustrates a bur 63 extending through the passage.

Once the positioning arm 52 is connected to the carrier, it is carried into the patient's mouth and the carrier is secured to the anchor plate by means of bolt 35, see Figure 4. The head of the positioning arm may now be moved over any of the abutment teeth 20, 21, 24 and 25. Figure 5 shows the head overlapping the tooth 20. The selected dental bur is moved through the passage 60 of the bushing in the head and a hole or cavity 66 is drilled in the tooth, see Fig. 6. This operation is repeated on teeth 21, 24 and 25. As the positioning arm is connected to the carrier and the latter connected to the anchor plate, the holes or cavities drilled in these teeth must be parallel to each other. The abutment teeth are now ready for the next step in the preparation of them to receive an appliance.

By having several holes 36 and 43 in the anchor plate and carrier, it is possible to locate the positioning arm on the latter to the best advantage for the particular job being done.

Before briefly describing the technique regarding the complete preparation of the abutment teeth to receive an appliance, the apparatus will now be described in connection with the drilling of a hole or cavity in one of the abutment teeth, for example tooth 25, which has had to be repaired.

Referring to Figures 7 and 8, the carrier 34 is formed with a plurality of internally-threaded holes 70 around the edge thereof. A plurality of attaching arms 72 are also provided, each arm being similar to and smaller than the positioning arm 52. Each attachment arm is formed with an elongated slot 73 through which a bolt 74 extends to be threaded into one of the carrier holes 70, said bolt having an enlarged head 75. A head 78 is provided at the outer end of the attachment arm and has a bushing 79 removably secured therein by a set screw 60. Several of these bushings are provided for each arm head, and each bushing has a vertical passage 82 extending therethrough of a desired diameter through which a pin 83 may extend.

A pin 83 is inserted in the cavity of each of the abutment teeth 20, 21 and 24. The attachment arms 72 are adjusted and the bolts 74 tightened so that their heads 78 fit over these pins, thus positioning the carrier within the mouth. At the same time, the positioning arm 52 is adjusted to position its head over the abutment tooth 25 in order that a hole or cavity 66 may be drilled therein in the manner described above. This hole or cavity is bound to be parallel to those of the other abutment teeth.

Figures 9 to 12 of the drawings have been included in order to show how the cavities formed in the attachment teeth are used.

Figure 9 illustrates a prosthetic appliance or bridge 90 carrying artificial teeth 91 at opposite ends thereof. The bridge may be provided with any type of fastening means, and in this example, it is provided with four dowels 92, each of which extends laterally from the bridge and is bent upwardly at 93. It is to be understood that these upwardly bent portions are parallel to each other. The ends of the dowels are to be inserted in the prepared cavities in the abutment teeth, and any suitable means may be provided for removably retaining them therein. For example, a vertical slit 94 may be formed in each dowel for this purpose.

Figure 10 shows a small tubular elbow 96 to be fitted into a cavity. This elbow has a vertical portion 97 and a horizontal portion 98.

Figure 11 illustrates one way in which a horizontal groove 99 may be formed in the biting surfaces of the abutment tooth at right angles of the cavities 66 thereof. A special dental bur 100 has a tip 101 at its outer end which fits into a hole 102 in a pin 103. One end of this pin is inserted into the cavity and as it is pressed inwardly thereof, the bur, which is retained at right angles to the pin, cuts into the tooth. This drilling is continued until the groove 99 is substantially semi-circular in cross-section.

Referring to Figure 12, it will be seen that the end 97 of the tubular elbow has been inserted in the cavity 66 and is retained therein in any suitable manner, such as by means of cement 106. The other end 98 of the elbow lies in the groove 99 and has been ground down so that it is now substantialy semi-circular in cross-section.

The dowel 92 of the bridge 90 is shown just before it is inserted in the vertical portion 97 of the elbow, and the part of the dowel extending to the applicance will lie within the horizontal portion 98. The slot 94 gives the outer end of the dowel sufficient resiliency frictionally to engage the elbow. This retains the appliance in position and permits it to be removed when desired. If the appliance is not to be removed, the dowel may be cemented within the elbow.

Assuming again that the abutment tooth 25 has been repaired, the positioner device should be set in relation to the bridge 90 before it is inserted in the patient's mouth. In order to do this, the three attachment arms are placed over three of the appropriate dowels of the bridge, and then the bolts 94 are tightened to hold the arms in position. The positioning arm 52 is then fitted over the other dowel and tightened in this position. From this it will be seen that when the device is inserted in the mouth and the outer ends of the attachment arms fitted over pins 83, the outer end of the arm 52 is located over tooth 25 in the correct position to enable a new cavity to be drilled which is correctly located and parallel with the cavities of the other abutment teeth.

What I claim as my invention is:

1. Apparatus for positioning dental burs for drilling parallel cavities in a plurality of teeth anywhere in a dental arch, comprising a carrier to be located inside a dental arch, a positioning arm adjustably mounted near one end thereof against the surface of the carrier, said arm being adjustable longitudinally of itself relative to the carrier, and means at the other end of the arm of the arm for guiding a dental bur axially towards the biting surface of a tooth while said bur is being used to drill a cavity in the tooth, said arm being movable to position the guide means over any tooth of the arch.

2. Apparatus for positioning dental burs as claimed in claim 1 in which the guide means is such that all cavities drilled in teeth of a dental arch are parallel to each other.

3. Apparatus for positioning dental burs as claimed in claim 1 in which the guide means comprises a passage through which the bur may extend, said passage extending towards the biting surfaces of the teeth.

4. Apparatus for positioning dental burs as claimed in claim 1 in which the guide means comprises a bushing carried by the arm and having a passage therein through which the bur may extend, said passage extending towards the biting surfaces of the teeth.

5. Apparatus for positioning dental burs as claimed in claim 4 in which the bushing is removably mounted on the arm.

6. Apparatus for positioning dental burs for drilling parallel cavities in a plurality of teeth anywhere in a dental arch, comprising an anchor plate to be located in a dental arch substantially level relative to the teeth thereof, a carrier overlying the anchor plate, a positioning arm lying over and against the carrier and having an elongated slot therein, a hollow bolt extending through the arm slot threaded into the carrier, another bolt extending through the hollow bolt threaded into the anchor plate to secure the carrier to the latter, and means on the arm for guiding a dental bur while the latter is being used to drill a cavity in a tooth, said arm being movable to position the guide means over any tooth of the arch.

7. Apparatus for positioning dental burs for drilling parallel cavities in a plurality of teeth anywhere in a dental arch, comprising a mass of plastic composition which softens at low temperatures, said mass being moldable to fit within a dental arch, an anchor plate fixedly connected to the plastic mass, said plate being retained substantially level relative to the teeth of the arch, a carrier, means for removably connecting the carrier to the anchor plate, a positioning arm adjustably mounted against the surface of the carrier, said arm being adjustable longitudinally of itself relative to the carrier, and means on the arm for guiding a dental bur axially towards the biting surface of a tooth while said bur is being used to drill the cavity in a tooth, said arm being movable to position the guide means over any tooth of the arch.

8. Apparatus for positioning dental burs for drilling parallel cavities in a plurality of teeth anywhere in a dental arch, comprising a carrier to be located inside a dental arch, a levelling plate larger than and overlying the carrier, and means for removably connecting the plate to the carrier.

9. Apparatus for positioning dental burs as claimed in claim 8 including an anchor plate, and means for removably connecting the carrier to the anchor plate.

10. Apparatus for positioning dental burs for drilling parallel cavities in a plurality of teeth anywhere in a dental arch, comprising a mass of plastic composition which softens at low temperatures, said mass being moldable to fit within a dental arch, an anchor plate fixedly connected to the plastic mass, a levelling plate larger than and overlying the anchor plate, and means for removably connecting the levelling plate to the anchor plate, said levelling plate being adapted to bear against the teeth of the dental arch substantially to level the anchor plate relative to said teeth.

11. Apparatus for positioning dental burs for drilling parallel cavities in a plurality of teeth anywhere in a dental arch, comprising a mass of plastic composition which softens at low temperatures, said mass being moldable to fit within a dental arch, an anchor plate fixedly connected to the plastic mass, a carrier overlying the anchor plate, means for removably connecting the carrier to the anchor plate, a levelling plate larger than and overlying the carrier, and means removably connecting the levelling plate to the carrier, said leveling plate being adapted to bear against the teeth of the dental arch substantially to level the anchor plate relative to said teeth.

12. Apparatus for positioning dental burs for drilling parallel cavities in a plurality of teeth anywhere in a dental arch, comprising a carrier to be located inside a dental arch, a positioning arm adjustably mounted on the carrier, means on the arm for guiding a dental bur while the latter is being used to drill a cavity in a tooth, said arm being movable to position the guide means over any tooth of the arch, at least one attaching arm adjustably connected to the carrier, and means on each attaching arm for engaging a pin projecting from a tooth.

13. Apparatus for positioning dental burs for drilling parallel cavities in a plurality of teeth anywhere in a dental arch, comprising a carrier to be located inside a dental arch, a positioning arm adjustably mounted on the carrier, means on the arm for guiding a dental bur while the latter is being used to drill a cavity in a tooth, said arm being movable to position the guide means over any tooth of the arch, at least one attaching arm adjustably connected to the carrier, and a passage in each attaching arm for receiving a pin projecting from a tooth.

14. Apparatus for positioning dental burs for drilling parallel cavities in a plurality of teeth anywhere in a dental arch, comprising a carrier to be located inside a dental arch, a positioning arm adjustably mounted on the carrier, a passage through the arm extending toward the teeth through which a dental bur may extend to drill a cavity in a tooth, said arm being movable to position the passage over any tooth of the arch, at least one attaching arm adjustably connected to the carrier, and a passage in each attaching arm for receiving a pin projecting from a tooth, each attaching arm passage being parallel with the passage of the positioning arm.

15. Apparatus for positioning dental burs as claimed in claim 14 in which each attaching arm passage is located in a bushing removably mounted on said arm.

16. Apparatus for positioning dental burs for drilling parallel cavities in a plurality of teeth anywhere in a dental arch, comprising a carrier to be located inside a dental arch, a positioning arm adjustably mounted on the carrier, means on the arm for guiding a dental bur axially towards the biting surface of a tooth while said bur is being used to drill a cavity in a tooth, said arm being movable to position the guide means over any tooth of the arch, a plurality of attaching arms adjustably connected to the carrier, and a passage in each attaching arm for receiving a pin projecting axially from a tooth.

17. Apparatus for positioning dental burs for drilling parallel cavities in a plurality of teeth anywhere in a dental arch, comprising a carrier to be located inside a dental arch, a positioning arm adjustably mounted near one end thereof against the surface of the carrier, means at the other end of the arm for guiding a dental bur axially towards the biting surface of a tooth, while said bur is being used to drill a cavity in the tooth, said arm being movable to position the guide means over any tooth of the arch, a plurality of attaching arms adjustably connected to the carrier, at least one of the attaching arms being located on each of opposite sides of the carrier, and a passage in each attaching arm for receiving a pin projecting axially from a tooth.

18. Apparatus for positioning dental burs for drilling parallel cavities in a plurality of teeth anywhere in a dental arch, comprising a carrier to be located inside a dental arch, a positioning arm lying over and against the carrier, means for adjustably connecting the arm to the carrier, means on the arm for guiding a dental bur while the latter is being used to drill a cavity in a tooth, said arm being movable to position the guide means over any tooth of the arch, a plurality of attaching arms lying over and against the carrier, means for adjustably connecting each attaching arm to the carrier, and a passage in each attaching arm for receiving a pin projecting axially from a tooth.

References Cited in the file of this patent

UNITED STATES PATENTS

| Number | Name | Date |
|---|---|---|
| 1,244,792 | Stoll | Oct. 30, 1917 |
| 2,233,722 | Weigele | Mar. 4, 1941 |
| 2,303,475 | Karlstrom III | Dec. 1, 1942 |
| 2,318,403 | Karlstrom | May 4, 1943 |
| 2,434,320 | Karlstrom | Jan. 13, 1948 |